(12) United States Patent
Adams et al.

(10) Patent No.: US 8,051,519 B1
(45) Date of Patent: Nov. 8, 2011

(54) COLLAPSIBLE SMALL VEHICLE LOADER APPARATUS

(76) Inventors: Lemoen C. Adams, Taylor, MI (US); Bradley C. Adams, Taylor, MI (US)

( * ) Notice: Subject to any disclaimer, the term of this patent is extended or adjusted under 35 U.S.C. 154(b) by 0 days.

(21) Appl. No.: 12/943,397

(22) Filed: Nov. 10, 2010

(51) Int. Cl.
*E01D 1/00* (2006.01)

(52) U.S. Cl. .................................. 14/71.1; 14/69.5

(58) Field of Classification Search ........... 14/69.5, 14/71.1; 296/61; 119/847; 414/462
See application file for complete search history.

(56) References Cited

U.S. PATENT DOCUMENTS

| | | | | |
|---|---|---|---|---|
| 5,287,579 | A * | 2/1994 | Estevez, Jr. | 14/71.1 |
| 5,451,088 | A * | 9/1995 | Broad | 296/26.08 |
| 5,649,732 | A * | 7/1997 | Jordan et al. | 296/26.1 |
| 5,950,890 | A * | 9/1999 | Darby | 224/402 |
| 6,250,874 | B1 * | 6/2001 | Cross | 414/537 |
| 6,296,290 | B1 | 10/2001 | Wolf | |
| 6,533,337 | B1 * | 3/2003 | Harshman et al. | 296/26.08 |
| 6,536,822 | B1 * | 3/2003 | Vagedes et al. | 296/26.1 |
| 6,722,721 | B2 | 4/2004 | Sherrer et al. | |
| 6,769,583 | B1 * | 8/2004 | Gordon et al. | 224/506 |
| 2004/0232185 | A1 | 11/2004 | Darby | |
| 2009/0123259 | A1 | 5/2009 | Barclay | |
| 2010/0032918 | A1 * | 2/2010 | Chamoun | 280/30 |
| 2010/0038391 | A1 | 2/2010 | Cumbie | |

* cited by examiner

*Primary Examiner* — Thomas Will
*Assistant Examiner* — Abigail A Risic
(74) *Attorney, Agent, or Firm* — Crossley Patent Law; Mark A. Crossley

(57) ABSTRACT

The collapsible small vehicle loader apparatus provides for use with an existing receiver hitch, such as those often used on pickups, cars, vans, and other vehicles. Ideally made of aluminum, the apparatus provides for easy, lightweight transport to and engagement with a receiver hitch. While the first ramp downturns may most easily engage a pickup tailgate from above, the apparatus may also be easily fitted to other vehicles that may provide a rest as the tailgate of a pickup does, for the first ramps. After engagement with the transport vehicle, the apparatus may be collapsed and elevated and thereby remain engaged as desired. In loading a small vehicle such as an ATV or golf cart for example, the appropriate pins are disengaged to extend the ramps, and then inserted to hold the ramps in the extended position.

2 Claims, 4 Drawing Sheets

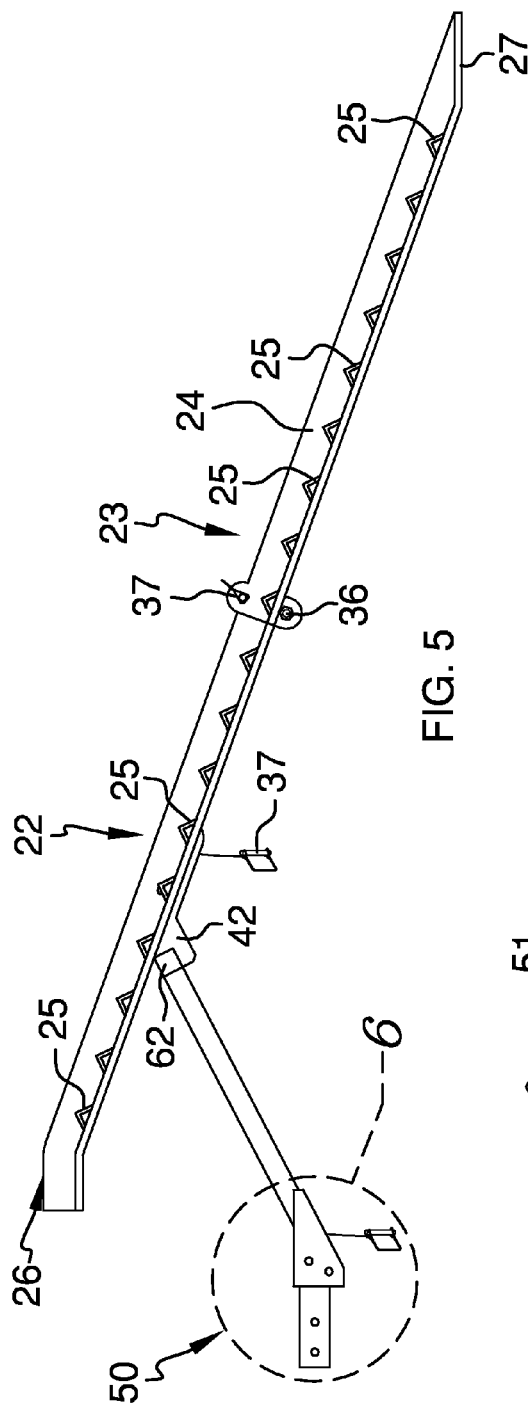
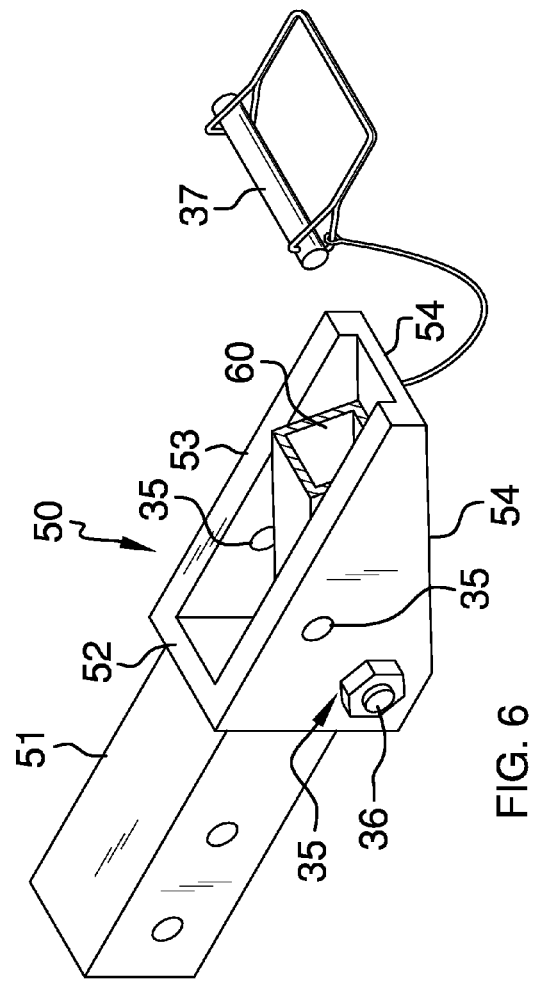
FIG. 5
FIG. 6

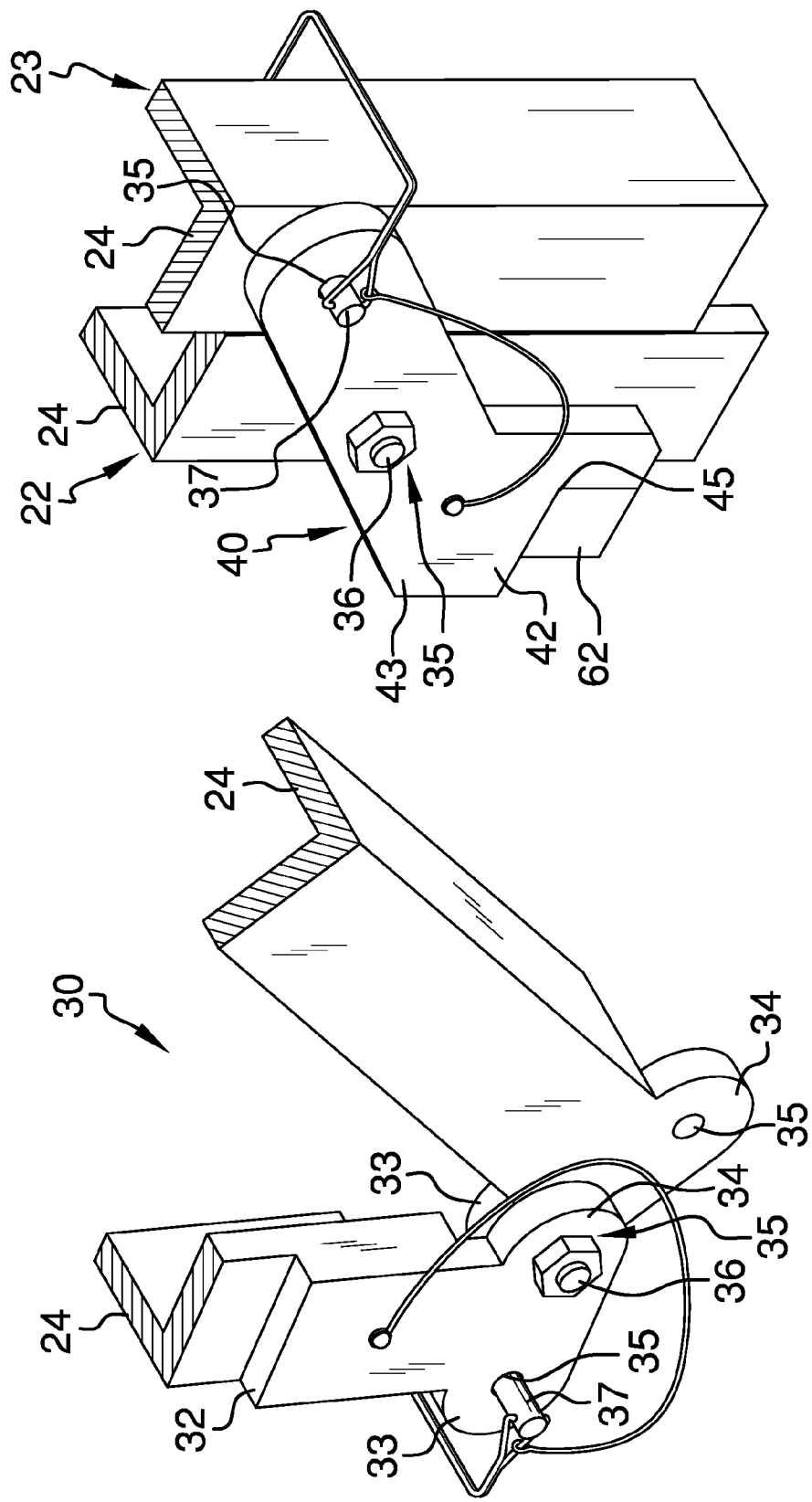

COLLAPSIBLE SMALL VEHICLE LOADER APPARATUS

BACKGROUND OF THE INVENTION

There remain challenges in creating the ideal small vehicle loader. For example, many loaders are cumbersome and difficult to use. Those devices that merely rest upon a pickup bed, for example, are subject to movement as well as difficulty in pickup engagement, disengagement, and device transport. Some small vehicle loading devices are too short and thereby provided too steep of loading and unloading angles. Some loading devices are too long and difficult to use and transport. The present apparatus solves these problems and provides support advantages not heretofore provided.

FIELD OF THE INVENTION

The collapsible small vehicle loader apparatus relates to loading ramps for use in loading small vehicles into larger vehicles, and more especially to a lightweight, collapsible loader apparatus that may be easily user transported, and may selectively remain engaged with a transporting slave vehicle while at the same time providing full support for loading a small vehicle.

SUMMARY OF THE INVENTION

The general purpose of the collapsible small vehicle loader apparatus, described subsequently in greater detail, is to provide a collapsible small vehicle loader apparatus which has many novel features that result in an improved collapsible small vehicle loader apparatus which is not anticipated, rendered obvious, suggested, or even implied by prior art, either alone or in combination thereof.

To attain this, the collapsible small vehicle loader apparatus provides for use with an existing receiver hitch, such as those often used on pickups, cars, vans, and other vehicles. Ideally made of aluminum, the apparatus provides for easy, lightweight transport to and engagement with a receiver hitch. While the first ramp downturns may most easily engage a pickup tailgate from above, the apparatus may also be easily fitted to other vehicles that may provide a rest as the tailgate of a pickup does, for the optional first ramp downturns. After engagement with the transport vehicle, the apparatus may be collapsed and elevated and thereby remain engaged as desired.

In loading a small vehicle such as an ATV or golf cart for example, the appropriate pins are disengaged to extend the ramps, and then inserted to hold the ramps in the extended position.

For further example of use, the downturns of the front ramps rest on a pickup opened tailgate with the hitch insert of the mount inserted into the existing receiver hitch of the vehicle. The small vehicle might be driven into the pickup bed. The pins are then removed and the first ramp elevated into an upright position at the rear of the pickup. The second ramp is moved vertically alongside the first. Pins are then reinserted to retain the ramps in an upright position. The pickup might be driven to a destination thereby without the apparatus having to be removed. Upon arrival at a destination, the pins may again be removed from the ramps and the ramps extended. Pins are then reinserted to hold the ramps in the loading/unloading position. After the small vehicle is removed from the pickup, the ramps can remain extended or returned to the upright position as desired.

Each first ramp may have a downturn to further assist in resting upon a pickup bed or the like and to also transition between each ramp and such beds. Each second ramp may have a downwardly and rearwardly disposed slant to more gradually engage a surface such as a pavement or the ground.

Thus has been broadly outlined the more important features of the improved collapsible small vehicle loader apparatus so that the detailed description thereof that follows may be better understood and in order that the present contribution to the art may be better appreciated.

An object of the collapsible small vehicle loader apparatus is to be as compact as possible yet provide for ease of small vehicle loading.

Another object of the collapsible small vehicle loader apparatus is to provide for selectively retained pickup engagement, whether in use or in transport.

Another object of the collapsible small vehicle loader apparatus is to be extendable and collapsible.

A further object of the collapsible small vehicle loader apparatus is to easily engage and disengage with an existing receiver hitch.

An added object of the collapsible small vehicle loader apparatus is to also utilize a pickup tailgate for support.

And, an object of the collapsible small vehicle loader apparatus is to prevent ramp movements during loading and unloading.

These together with additional objects, features and advantages of the improved collapsible small vehicle loader apparatus will be readily apparent to those of ordinary skill in the art upon reading the following detailed description of presently preferred, but nonetheless illustrative, embodiments of the improved collapsible small vehicle loader apparatus when taken in conjunction with the accompanying drawings.

BRIEF DESCRIPTION OF THE DRAWINGS

FIG. 5 is a lateral elevation partial cross sectional view of the apparatus extended, the inner side of one ramp assembly exposed, one connect arm affixed to the outer side of the outer ramp rail of one first ramp.

FIG. 6 is a perspective view of the mount.

FIG. 7 is a perspective view of the ramp pivot.

FIG. 8 is a perspective view of the connect arm.

DETAILED DESCRIPTION OF THE DRAWINGS

Figure 1:
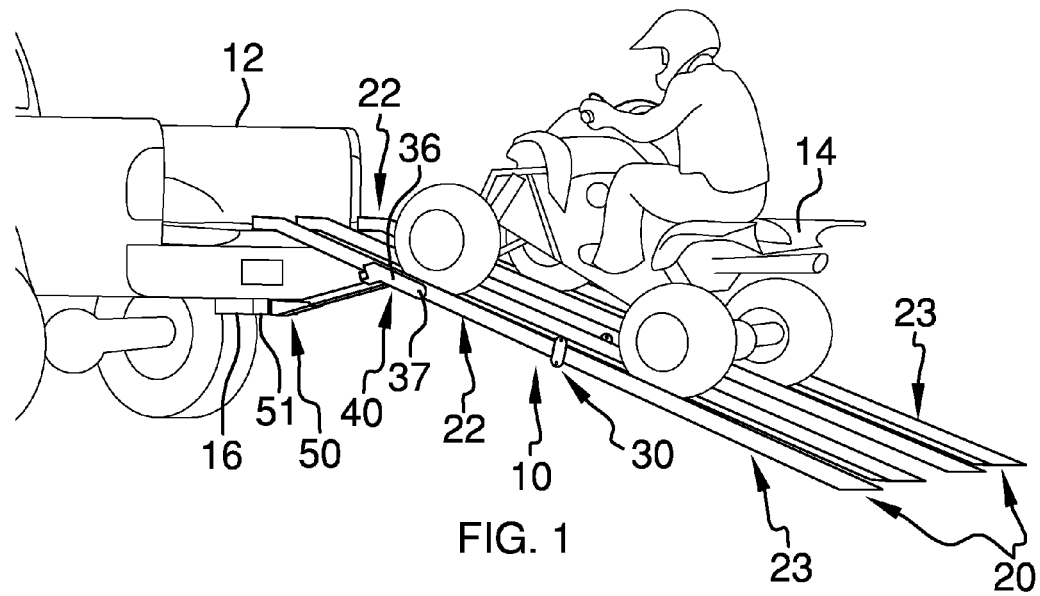
FIG. 1 is a perspective view of the apparatus in use.

With reference now to the drawings, and in particular FIGS. 1 through 8 thereof, the principles and concepts of the collapsible small vehicle loader apparatus generally designated by the reference number 10 will be described.

Referring to FIG. 6, the apparatus 10 partially comprises the mount 50 having a horizontally disposed hitch insert 51 removably inserted into an existing vehicle such as the pickup 12 receiver hitch 16. The u-shaped member 52 is extended horizontally rearward from the hitch insert 51. The u-shaped member 52 has a top 53 spaced apart from an upwardly slanted bottom 54. The pair of spaced apart orifices 35 is disposed horizontally through the u-shaped member 52. The orifices 35 are perpendicular to the u-shaped member 52 length. The upper of the orifices 35 are slightly rearward of the lower of the orifices 35. The extension member 60 is pivotally extended from the u-shaped member 52. The extension member 60 is pivotally affixed to the u-shaped member 52 by a pivot bolt 36 inserted through the extension member 60 and the lower of the orifices 35. The u-shaped member 52 has a slanted bottom 54 limiting a downward movement of the extension member 60.

Figure 4:
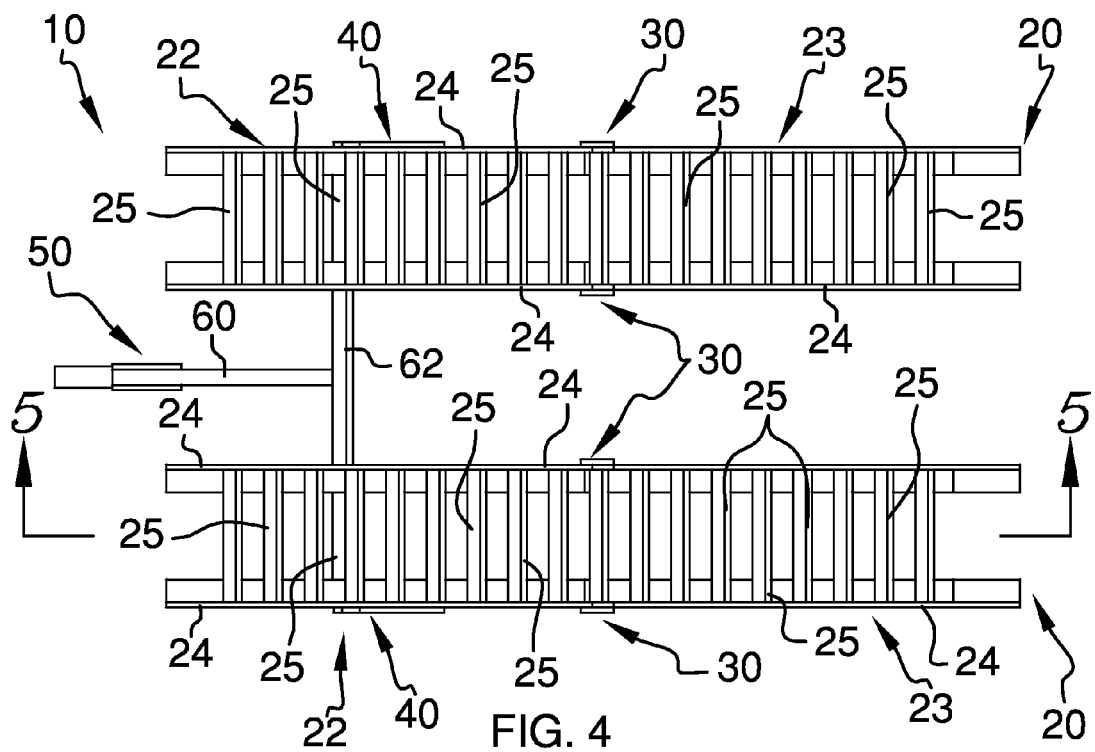
FIG. 4 is a top plan view of the extended apparatus.

Referring to FIG. 4, the crossbar 62 is affixed perpendicularly and rearwardly to the extension member 60. The pair of identical spaced apart ramp assemblies 20 is provided.

Figure 2:
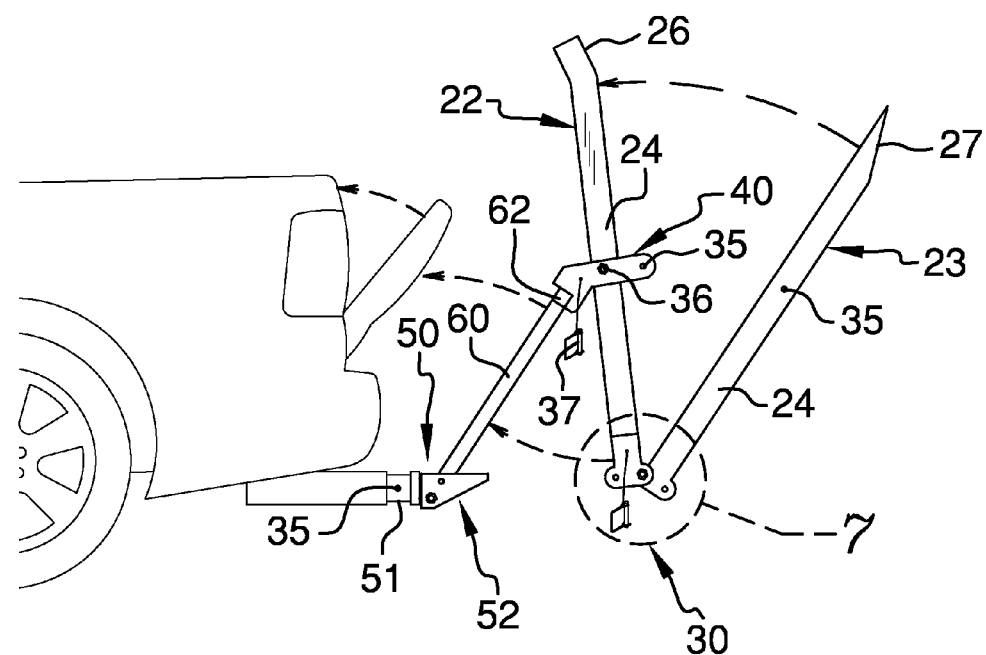
FIG. 2 is a lateral elevation view of the apparatus being collapsed into an upright position, while engaged with the pickup receiver hitch.

Referring to FIG. 2, each ramp assembly 20 comprises a first ramp 22 pivotally engaged with a second ramp 23. Each ramp has a pair of identical mirror image spaced apart inner and outer rails 24 separated by affixed spaced apart rungs 25. A downturn 26 is disposed forwardly on each first ramp 22. A slant 27 is disposed downwardly and rearwardly on each second ramp 23.

Referring to FIG. 8, the pair of identical connect arms 40 is provided. One of each connect arm 40 is affixed to the outer rail 24 of each first ramp 22. Each connect arm 40 comprises a connect plate 42 affixed longitudinally, outwardly, and about midway to one of each of the first ramp 22 outer rails 24. A right angle cutout 45 is disposed in each connect plate 42. One of each right angle cutout 45 is affixed to one of each end of the crossbar 62 whereby one of each of the first ramps 22 selectively rests upon the crossbar 62 with one of each of the first ramps 22 coplanarly positioned with one of each of the second ramps 23.

An angled plate 43 is extended rearwardly and upwardly from each connect plate 42. A pair of spaced apart orifices 35 is disposed within each angled plate 43. Each orifice 35 is slightly offset in alignment along the angled plate 43. A pivot bolt 36 pivotally secures one of each angled plate 43 outwardly and about midway to one of each of the outer rails 24 of each first ramp 22. A removable pin 37 secures one of each of the angled plates 43 outwardly and positionally to one of each of the outer rails 24 of the first ramps 22. The pin 37 further selectively secures one of each of the outer rails 24 of the second ramps 23 to one of each of the angled plates 43.

Figure 3:
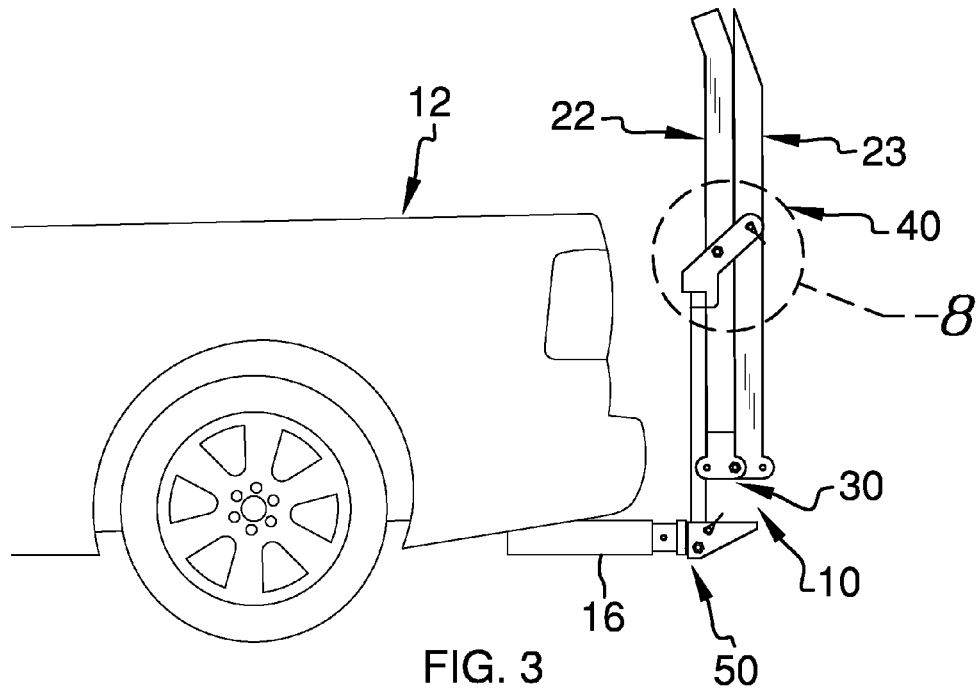
FIG. 3 is a lateral elevation view of the apparatus in the fully collapsed state while engaged with the receiver hitch of the pickup.

Referring to FIGS. 3 and 5, one of each of the first ramps 22 is selectively positioned vertically parallel with one of each of the second ramps 23. One of each of the first ramps 22 is further selectively positioned coplanarly with one of each of the second ramps 23.

Referring to FIG. 7, a pair of spaced apart ramp pivots 30 is provided. One ramp pivot 30 pivotally connects one of each first ramp 22 rearwardly both inwardly and one ramp pivot 30 outwardly to one of each second ramp 23 forwardly both inwardly and outwardly. Each ramp pivot 30 further comprises a pivot plate 32 connected rearwardly to each first ramp 22. A pair of opposite pivot plate 32 ears comprises a first ear 33 and a second ear 34. The ears extend perpendicularly from each pivot plate 32. An orifice 35 is disposed in each first ramp 22 ear. A pair of opposite second ramp 23 ears is provided. Each second ramp 23 comprises one first ear 33 and one second ear 34 extended forwardly and perpendicularly from each second ramp 23 rail 24. An orifice 35 is disposed in each second ramp 23 ear. A pivot bolt 36 pivotally connects one of each first ramp 22 second ear 34 to one of each second ramp 23 first ear 33.

Referring to FIGS. 1 and 5, a pin 37 removably connects one of each first ramp 22 first ear 33 to one of each second ramp 23 second ear 34. The ramps may thereby be selectively secured coplanarly.

Referring to FIG. 3, the pins may be pulled from the first ear 33 of the first ramp 22 and the second ear 34 of the second ramp 23 to allow the ramps to be positioned in parallel by the connect arms 40.

Referring to FIG. 1, the mount 50 hitch insert 51 is inserted into the receiver hitch 16 of the pickup 12. The apparatus 10 ramps are extendedly locked in a position of first ramp 22 and second ramp 23 coplanar positioning. The ATV 14 is driven up or down the ramp assemblies 20.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the collapsible small vehicle loader apparatus may be used.

What is claimed is:

1. A collapsible small vehicle loader apparatus comprising, in combination:

a mount having a horizontally disposed hitch insert removably inserted into an existing vehicle receiver hitch;

a u-shaped member extended horizontally rearward from the hitch insert, the u-shaped member having a top spaced apart from an upwardly slanted bottom;

a pair of spaced apart orifices disposed horizontally through the u-shaped member, the orifices perpendicular to the u-shaped member, an upper of the orifices slightly rearward of a lower of the orifices;

an extension member pivotally extended from the u-shaped member, the extension member pivotally affixed to the u-shaped member by a pivot bolt inserted through the extension member and the lower of the orifices, the u-shaped member slanted bottom limiting a downward movement of the extension member;

a crossbar affixed perpendicularly and rearwardly to the extension member;

a pair of identical spaced apart ramp assemblies, each ramp assembly comprising a first ramp pivotally engaged with a second ramp, each ramp having a pair of identical mirror image spaced apart inner and outer rails separated by affixed spaced apart rungs;

a pair of identical connect arms, one of each connect arm affixed to the outer rail of each first ramp, each connect arm comprising a connect plate affixed longitudinally, outwardly, and about midway to one of each of the first ramps;

a right angle cutout disposed in each connect plate, one of each right angle cutout affixed to a one of an each end of the crossbar, whereby one of each of the first ramps selectively rests upon the crossbar with one of each of the first ramps coplanarly positioned with one of each of the second ramps;

an angled plate extended rearwardly and upwardly from each connect plate;

a pair of spaced apart orifices disposed within each angled plate, each orifice slightly offset in alignment along the angled plate;

a pivot bolt pivotally securing one of each angled plate outwardly and about midway to one of each of the outer rails of each first ramps;

a removable pin securing one of each of the angled plates outwardly and positionally to one of each of the outer rails of the first ramp, the pin further selectively securing one of each of the outer rails of the second ramps to one of each of the angled plates;

whereby one of each of the first ramps is selectively positioned vertically parallel with one of each of the second ramps, one of each of the first ramps further selectively positioned coplanarly with one of each of the second ramps;

a pair of spaced apart ramp pivots pivotally connecting one of each first ramp rearwardly both inwardly and outwardly to one of each second ramp forwardly both inwardly and outwardly, each ramp pivot further comprising:

a pivot plate connected rearwardly to each first ramp;

a pair of opposite pivot plate ears comprising a first ear and a second ear, the ears extended perpendicularly from each pivot plate;

an orifice disposed in each first ramp ear;

a pair of opposite second ramp ears comprising a first ear and a second ear extended forwardly and perpendicularly from each second ramp rail;

an orifice disposed in each second ramp ear;

a pivot bolt pivotally connecting one of each first ramp second ear to one of each second ramp first ear;

a pin removably connecting one of each first ramp first ear to one of each second ramp second ear, whereby the ramps may be selectively secured coplanarly.

2. A collapsible small vehicle loader apparatus comprising, in combination:

a mount having a horizontally disposed hitch insert removably inserted into an existing vehicle receiver hitch;

a u-shaped member extended horizontally rearward from the hitch insert, the u-shaped member having a top spaced apart from an upwardly slanted bottom;

a pair of spaced apart orifices disposed horizontally through the u-shaped member, the orifices perpendicular to the u-shaped member, an upper of the orifices slightly rearward of a lower of the orifices;

an extension member pivotally extended from the u-shaped member, the extension member pivotally affixed to the u-shaped member by a pivot bolt inserted through the extension member and the lower of the orifices, the u-shaped member slanted bottom limiting a downward movement of the extension member;

a crossbar affixed perpendicularly and rearwardly to the extension member;

a pair of identical spaced apart ramp assemblies, each ramp assembly comprising a first ramp pivotally engaged with a second ramp, each ramp having a pair of identical mirror image spaced apart inner and outer rails separated by affixed spaced apart rungs;

a downturn disposed forwardly on each first ramp;

a slant disposed downwardly and rearwardly on each second ramp;

a pair of identical connect arms, one of each connect arm affixed to the outer rail of each first ramp, each connect arm comprising a connect plate affixed longitudinally, outwardly, and about midway to one of each of the first ramps;

a right angle cutout disposed in each connect plate, one of each right angle cutout affixed to a one of an each end of the crossbar, whereby one of each of the first ramps selectively rests upon the crossbar with one of each of the first ramps coplanarly positioned with one of each of the second ramps;

an angled plate extended rearwardly and upwardly from each connect plate;

a pair of spaced apart orifices disposed within each angled plate, each orifice slightly offset in alignment along the angled plate;

a pivot bolt pivotally securing one of each angled plate outwardly and about midway to one of each of the outer rails of each first ramps;

a removable pin securing one of each of the angled plates outwardly and positionally to one of each of the outer rails of the first ramp, the pin further selectively securing one of each of the outer rails of the second ramps to one of each of the angled plates;

whereby one of each of the first ramps is selectively positioned vertically parallel with one of each of the second ramps, one of each of the first ramps further selectively positioned coplanarly with one of each of the second ramps;

a pair of spaced apart ramp pivots pivotally connecting one of each first ramp rearwardly both inwardly and outwardly to one of each second ramp forwardly both inwardly and outwardly, each ramp pivot further comprising:

a pivot plate connected rearwardly to each first ramp;

a pair of opposite pivot plate ears comprising a first ear and a second ear, the ears extended perpendicularly from each pivot plate;

an orifice disposed in each first ramp ear;

a pair of opposite second ramp ears comprising a first ear and a second ear extended forwardly and perpendicularly from each second ramp rail;

an orifice disposed in each second ramp ear;

a pivot bolt pivotally connecting one of each first ramp second ear to one of each second ramp first ear;

a pin removably connecting one of each first ramp first ear to one of each second ramp second ear, whereby the ramps may be selectively secured coplanarly.

\* \* \* \* \*